July 16, 1968 — E. L. HAWES — 3,392,467
CAR TOP SIGN CARRIER
Filed Feb. 17, 1966
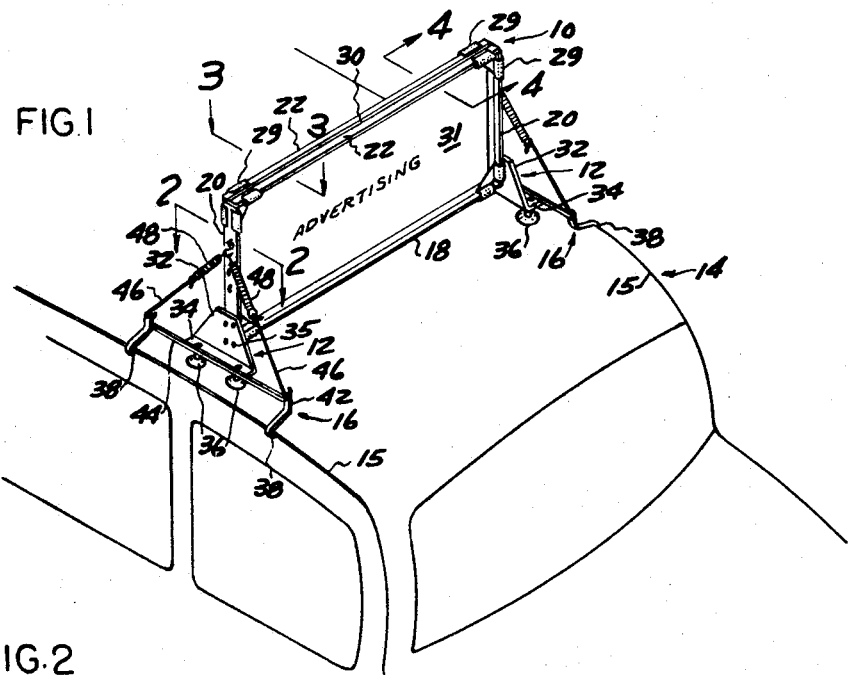
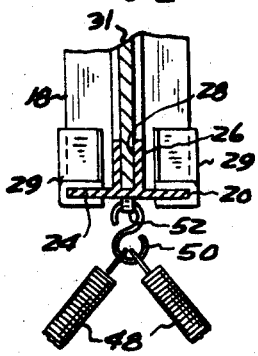
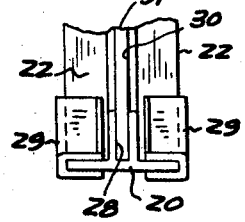
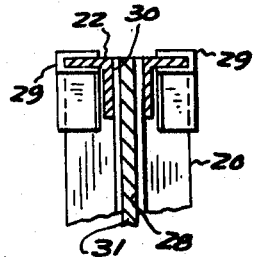
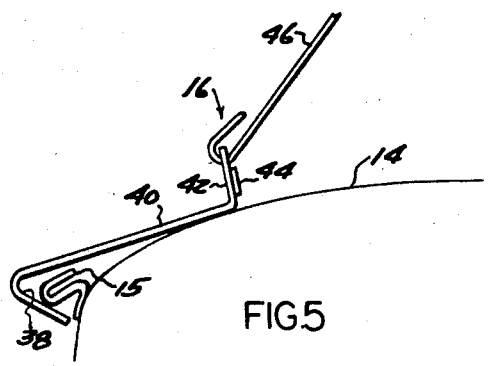
INVENTOR
EDWARD L. HAWES
BY
ATTORNEY 3,392,467
CARTOP SIGN CARRIER
Edward L. Hawes, 405 E. Goulson,
Hazel Park, Mich. 48030
Filed Feb. 17, 1966, Ser. No. 528,266
8 Claims. (Cl. 40—129)

ABSTRACT OF THE DISCLOSURE

A sign holder to be mounted on the top of an automobile including a frame for carrying the sign in a position extending transversely of the automobile, a right angle connector plate secured to the lower opposite sides of the frame, suction cups mounted on the plates to engage the top of the automobile and to thereby support the frame, a pair of hooked members for connection to each side of the automobile connected to one another by a spacer bar and to the frame by a pair of springs.

---

This invention relates to automobile-top carriers for advertising or display material and more particularly to an improved retaining arrangement for such carriers that are mounted transversely on the roof of an automobile.

Heretofore devices for mounting display cards and similar advertising material on the roofs of automobiles have either been difficult and inconvenient to affix to the automobile or they have not been adapted to stay securely thereon. The advertising material usually presents a broad surface exposed to wind forces which tend to disengage the mounting device from the automobile and to mar the finish of the car as the retaining device shifts in response to varying wind loads and road irregularities. The more successful retaining devices have necessitated a relatively complicated structure that is difficult and inconvenient to attach to the automobile or have required the formation of special apertures in the automobile body roof.

The present invention obviates the problems encountered in previous devices by providing a lightweight, vertical, rectangular frame having an inwardly facing peripheral slot formed in the two sides and bottom and a longitudinal opening in the top member so that a board of advertising copy may be easily inserted and conveniently changed. A right angle connector plate is fixed to the lower portion of each end of the frame and a pair of resilient suction cups attached to the foot of each connector plate. The suction cups provide a means for separating the frame from the roof of the automobile in a nonmarring fashion. In order to retain the frame to the automobile, a pair of hooks are provided to engage the drip molding of each side of the automobile. Each hook has an elongated shank which rests on the curved side surface of the roof. The shanks of each pair of hooks are fixed to an elongated spacer bar. One of each pair of hooks is engaged to the drip molding forward of the frame and the other hook is engaged rearwardly of the frame. The hooks and shanks are coated with a vinyl plastic so that the contact points with the automobile will not mar the surface finish. The frame is resiliently connected to the hooks by a pair of tension springs connected to each side of the frame, and each spring is connected to the shank of a hook by an elongated wire clip. It can therefore be seen that the frame may be easily and firmly mounted to the roof of the automobile by mounting the frame transversely to the longitudinal axis of the car and engaging the hooks to the drip moldings. The springs cooperate with the hooks to provide resilient stability to the frame readily able to absorb varying and substantial wind forces. The frame may be quickly removed from the roof of the automobile by releasing the hooks from the drip molding and disengaging the suction cups.

It is therefore an object of the present invention to improve the retaining device for a cartop carrier sign holder mounted transversely to the longitudinal axis of the car by providing a pair of hooks resiliently connected to each side of the sign holder frame and engaged forward and behind the frame to the drip molding of the automobile.

It is another object of the present invention to provide an improved cartop carrier for displaying advertising copy by providing a frame defining a rectangular opening and having an inwardly facing peripheral slot formed in the sides and bottom of the frame and an elongated opening in the top so the advertising copy may be slidably inserted in the frame so as to be exposed through the opening defined by the frame, and the frame adapted to be resiliently mounted on the roof of an automobile.

Still further objects of my invention will readily occur to one skilled in the art to which the invention pertains upon reference to the following detailed description and accompanying drawings in which like reference characters refer to like parts and in which:

FIGURE 1 is a perspective view illustrating a preferred embodiment of the cartop carrier mounted on the roof of an automobile;

FIGURE 2 is a sectional view as seen from line 2—2 of FIGURE 1;

FIGURE 3 is a sectional view as seen from line 3—3 of FIGURE 1;

FIGURE 4 is a sectional view as seen from line 4—4 of FIGURE 1; and

FIGURE 5 is an enlarged view of a preferred hook engaging the drip molding of an automobile.

Now referring to the drawings, FIGURE 1 shows a preferred cartop carrier as comprising a rectangular advertising carrier frame 10; support means 12 for mounting the frame 10 in spaced-apart relationship to the roof of an automobile generally indicated at 14, and having a drip molding 15; and carrier retainer means 16 for detachably securing the frame 10 to the roof 14.

Frame 10 comprises a bottom horizontal member 18, having integral vertical side elements 20 normally extending from the ends thereof, and a pair of spaced right angle upper members 22 connecting the upper ends of the sides 20. FIGURE 2 illustrates the preferred cross-section of bottom member 18 and side elements 20 as comprising a base 24 having two normally extending and spaced ribs 26 defining a slot 28. As can best be seen in FIGURES 3 and 4, clips 29 attach the right angle members 22 to the upper outward facing surfaces of side member ribs 26, to define an elongated opening 30. Clips 29 also reinforce the bottom member 18 at the lower end of side elements 20 and are preferably held in place by crimping. The opening 30 and the slots 28 are adapted so that a board of advertising material 31 may be inserted between the upper members 22 and registered in the sides 20 and the bottom 18. The frame 10 is preferably formed of extruded elements from aluminum or other lightweight material to form a rigid but lightweight framework for the advertising material 31.

The support means 12 is adapted to mount the frame 10 to the automobile roof 14 and transversely to the longitudinal axis of the automobile. As can be seen in FIGURE 1, a right angle connector plate 32 having a projecting foot 34 is connected to opposite sides of the frame 10 preferably by bolts 35. The plates 32 are adapted to be connected to frame 10 with the feet 34, projecting outwardly as shown or inwardly by reversing their position. The plates 32 can therefore accommodate cars with different transverse dimensions. Preferably the frame 10 is spaced from the bottom of the connector plate 32. A pair of resilient suction cups 36 are supportingly mounted on the underside of each foot 34. It can therefore be seen that the frame 10 can be mounted in spaced nonmarring relationship to the roof 14.

The preferred carrier retainer means 16 comprises a pair of hooks 38 adapted to engage the drip molding 15 of each side of the roof 14, as can be seen in FIGURE 5. Each of the hooks 38 has an elongated shank 40 and a normally projecting finger portion 42. The shanks 40 and the fingers 42 of each pair of hooks are preferably parallel and fixed to spacer members 44. The hooks 38, shanks 40, fingers 42 and spacers 44 are preferably coated with a plastic such as a weather-resistant vinyl resin so that the points of contact of these members with the automobile will not mar the surface finish.

Elongated wire clips 46 connect the fingers 42 to tension spring members 48. Each pair of springs 48 is connected by an S-hook 50 to an eye 52 formed in the outward surface of each of the sides 20. Preferably each side 20 has a plurality of eyes 52 disposed one above the other to accommodate cars having different widths so that the springs 48 will be tensioned when the S-hooks 50 are engaged with the eyes 52. The spacer members 44 are chosen of a suitable length of approximately twelve (12) inches so that the springs 48 extend from the S-hooks 50 at an angle of about 45 degrees from one another and impose a tension force upon opposite sides of the frame 10.

In order to mount the cartop carrier illustrated in FIGURE 1, the frame 10 is located transversely of the roof 14 and a force exerted on the connector bracket feet 34 to engage the resilient suction cups 36 to the roof 14. The hooks 38 are then engaged to the drip molding 15 of the car so that one hook 38 on each side of the car is engaged forwardly and the other hook 46 is engaged rearwardly of the carrier. The springs 44 are tensioned when the hooks 38 are engaged. It is apparent that the carrier can pivot slightly on the resilient suction cups 36 when exposed to wind forces. This pivoting action on the hooks 38 is partially absorbed by the spring 48 which also assist in tightening the connection of the carrier to the drip molding and eliminates accidental disengagement of the carrier from the drip molding.

It is apparent that the carrier can be easily removed from the automobile by simply disengaging the hooks 38 from the drip molding so that the advertising material 31 can be changed by removing the old material through the opening 30 and slidably inserting new material in the frame 10. The improved carrier has further advantages in that it can be rigidly constructed of a few lightweight components which can be quickly fabricated with inexpensive clips 29.

Although I have described but one preferred embodiment of my invention it is to be understood that many modifications and changes can be made without departing from the spirit of the invention or the scope of the appended claims.

I claim:

1. A cartop sign carrier for displaying advertising material mounted transversely upon the roof of an automobile having a drip molding, said carrier comprising:

(a) a frame for retaining said advertising material, (b) a supporting means connected with opposite sides of said frame for engaging with said automobile roof and adapted to mount said frame on and in spaced relationship to said automobile roof, (c) two pairs of spring members with one pair of said spring members connected on each of opposite sides of said frame, (d) a hook connected to the free end of each of said spring members whereby said hooks are disposed in pairs on opposite sides of said frame, one of each pair of said hooks being adapted for releasable engagement with said trip molding forwardly of said frame and the other of each pair of said hooks adapted for releasable engagement with said drip molding rearwardly of said frame, and (e) each of said hooks having a shank and including a spacer member rigidly joining the shanks of each pair of said hooks.

2. A cartop sign carrier for displaying advertising material mounted upon the roof of an automobile having a drip molding, said carrier comprising:

(a) a frame for retaining said advertising material, (b) a supporting means connected with opposite sides of said frame for engaging with said automobile roof and adapted to mount said frame on but in spaced relationship to said automobile roof, (c) two pairs of spring members with one pair of said spring members connected on each of opposite sides of said frame, (d) a hook connected to the free ends of each of said frame members whereby said hooks are disposed in pairs on opposite sides of said frame, each pair of said hooks being adapted for releasable engagement with the drip molding of said automobile, and (e) a spacer member rigidly joining each pair of said hooks.

3. The combination as defined in claim 2 wherein said supporting means comprises:

(a) an angular connecting plate attached to opposite vertical sides of said frame, each of said plates having a foot portion extending below said frame, and (b) a pair of resilient members supportingly connected to the underside of each of said foot portions and said resilient members spaced from opposite faces of said frame so that said resilient members cooperate to support said frame in a vertical position.

4. A cartop carrier as defined in claim 2, wherein said frame comprises:

(a) a bottom horizontal member, (b) a pair of vertical side members normally extending from the ends of said bottom member, (c) a pair of horizontal top members joining the upper ends of said side members, said top members spaced to define an elongated opening, and all of said members forming a frame defining a rectangular opening, and (d) said bottom member and said side members formed with an inwardly facing slot registering with said elongated opening, so that a board of said advertising material may be inserted through said opening and retained by said slotted frame.

5. A cartop carrier as defined in claim 4, wherein said supporting means comprises:

(a) an angular connecting plate attached to opposite vertical sides of said frame, each of said plates having a foot portion extending below said bottom member, and (b) a pair of resilient members supportingly connected to the underside of each of said foot portions, and said resilient members spaced from opposite faces of said frame so that said resilient members cooperate to support said frame in a vertical position.

6. A cartop carrier as defined in claim 5, wherein said pair of resilient members comprise a pair of resilient suction cups.

7. A cartop carrier as defined in claim 4, wherein said side members and said bottom member are formed of an extruded element comprising:
(a) an elongated flat base,
(b) a pair of elongated ribs fixed to said base in spaced apart relationship to form an elongated slot.

8. A cartop carrier for displaying advertising material upon the roof of an automobile, said automobile having a drip molding, said carrier comprising:
(a) a frame for retaining said advertising material,
(b) a substantially triangular mounting plate carried on each side of said frame member and connected therewith,
(c) resilient members carried by said mounting plates for engaging the roof of said automobile to thereby support said frame,
(d) a pair of hook means each comprising a pair of hook members connected by a spacer bar with said hook members engaging the drip molding of said automobile forwardly and rearwardly of said frame and spring members connecting each pair of said hook members with said frame.

References Cited

UNITED STATES PATENTS

| | | | |
|---|---|---|---|
| 1,750,118 | 3/1930 | Mueller et al. | 40—138 |
| 2,814,140 | 11/1957 | Ellis | 40—125 |
| 2,888,763 | 6/1959 | Roycraft | 40—129 |
| 3,015,899 | 1/1962 | Ensign et al. | 40—125 |
| 1,942,444 | 1/1934 | O'Connor | 40—129 |
| 2,235,012 | 3/1941 | Colvin | 224—29 |
| 3,225,475 | 12/1965 | Shank | 40—129 |
| 3,234,677 | 2/1966 | McDaniel et al. | 40—129 |

FOREIGN PATENTS 508,518   2/1952   Belgium.

EUGENE R. CAPOZIO, *Primary Examiner.*

R. W. WEIG, *Assistant Examiner.*